United States Patent [19]

Warmann

[11] 3,796,293
[45] Mar. 12, 1974

[54] ARTICLE STOP FOR CONVEYORS
[75] Inventor: Bruno Warmann, Livonia, Mich.
[73] Assignee: Jervis B. Webb Company, Detroit, Mich.
[22] Filed: Aug. 19, 1971
[21] Appl. No.: 173,019

[52] U.S. Cl. .............................. 193/35 A
[51] Int. Cl. .............................. B65g 13/75
[58] Field of Search ......... 198/34, 26; 193/35 A, 40

[56] References Cited
UNITED STATES PATENTS
2,979,182  4/1961  Haab ................................ 198/34
3,088,569  5/1963  McClelland et al. ......... 193/35 A X
2,738,103  3/1956  Bisese ............................ 193/35 A X Primary Examiner—Evon C. Blunk
Assistant Examiner—James W. Miller

[57] ABSTRACT

A device for arresting movement of an article on a roller conveyor consists of a bar projecting outwardly from a cylindrical sleeve rotatably mounted on a shaft which in turn is rotatably supported on the conveyor between and parallel to an adjacent pair of rollers. Rotation of the sleeve on the shaft is resiliently opposed by a cluster of flexible rods mounted within the sleeve and extending parallel to the shaft, the rod ends being inserted in sockets of a pair of collars on the shaft, one collar being secured to the sleeve and the other to the shaft. A counterweight on the shaft urges the device to an obstructing position in which the bar extends into the path of movement of an article on the conveyor rollers, and a releasable latch prevents movement of the shaft from this position so that engagement of the bar by an oncoming article results in movement of the bar and sleeve being resiliently opposed by the flexible rods to absorb the momentum of the article.

12 Claims, 3 Drawing Figures

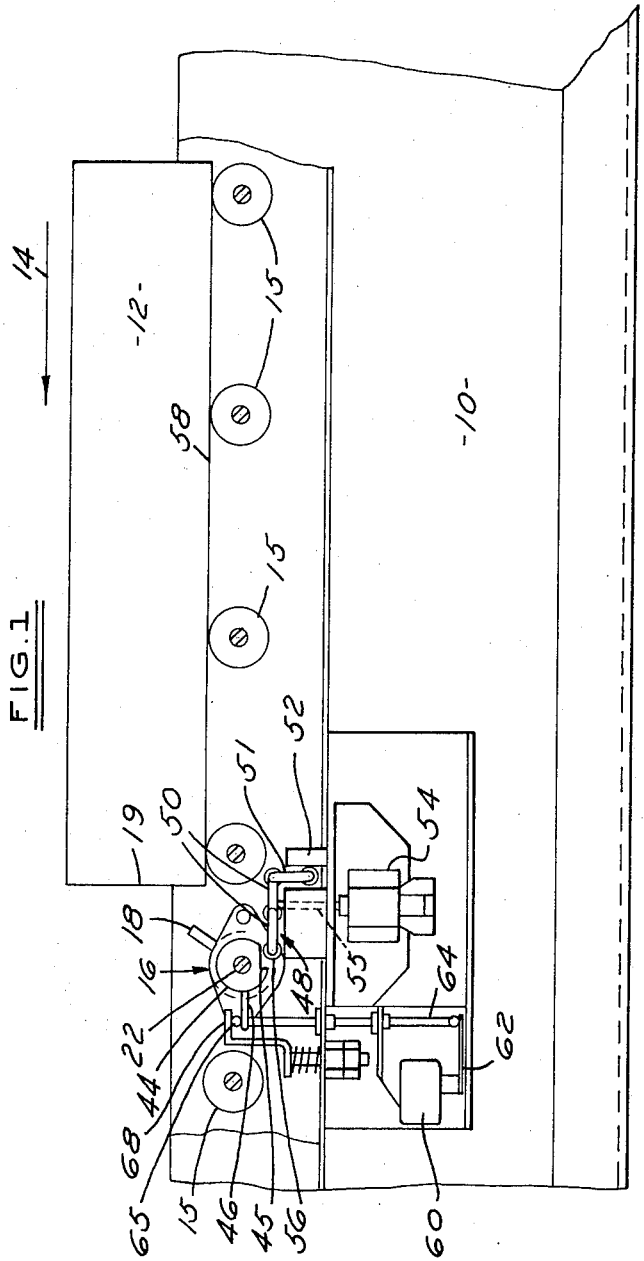

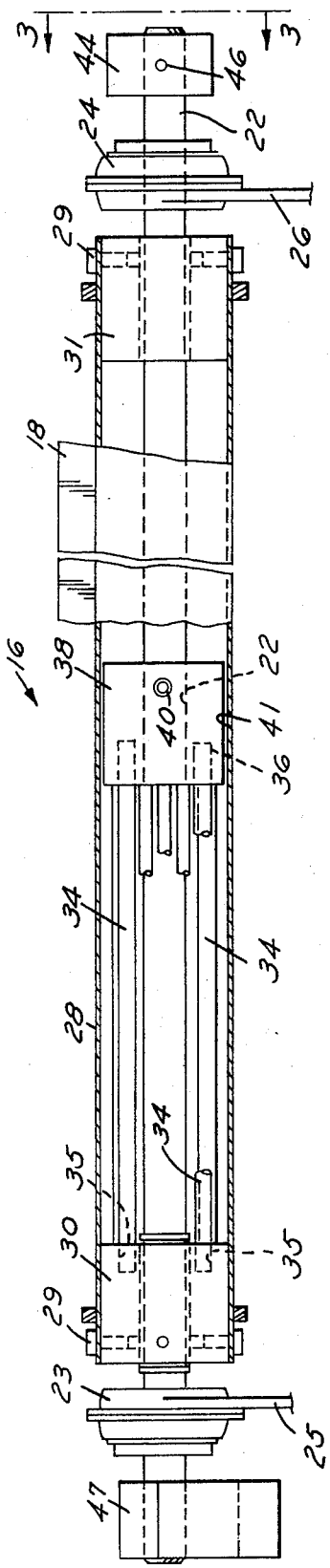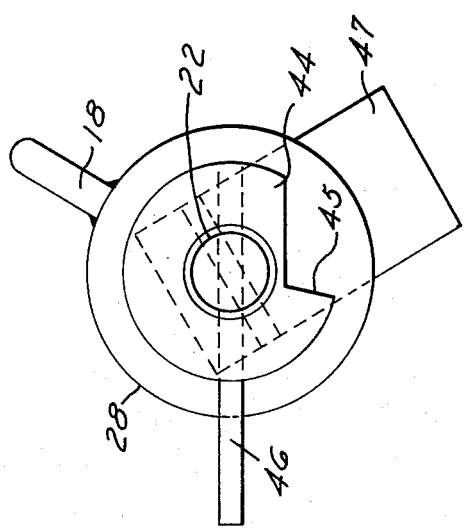

ARTICLE STOP FOR CONVEYORS

SUMMARY OF THE INVENTION

This invention relates to improvements in a device which is capable of arresting movement of an article on a conveyor, the term "article" including either an object such as a package or carton or a carrier on which an object is supported.

A device of this type has conventionally consisted of a member which is moveable between a non-obstructing and an obstructing position relative to the conveyed article and which acts in the latter position as a fixed abutment, abruptly arresting movement of the article when engaged thereby, and subjecting both the article and the stop device to the possibility of damage.

The present invention provides a stop device having the capability of absorbing at least a portion of the momentum of a conveyed article. In many of the instances where it is desired to use a stop device, for example, at a stopping station along a roller conveyor, the space available for installing the device is very limited, and the present invention provides a relatively high momentum absorbing capability in a relatively compact structure.

A stop device constructed in accordance with the invention comprises a shaft, a stop member, means mounting the member on the shaft for movement about the axis thereof, momentum absorbing means interposed between the stop member and the shaft for resiliently limiting such movement of the stop member, means supporting the shaft adjacent to the path of movement of a conveyed article for rotation between obstructing and non-obstructing positions of the stop member relative to the article, and, releasable means capable of preventing rotational movement of the shaft when the stop member is in obstructing position whereby engagement of the stop member by the article results in movement of the stop member on the shaft being opposed by the momentum absorbing means.

Preferably, the shaft and stop member is biased to the obstructing position by suitable means such as a counterweight mounted on the shaft; and, the momentum absorbing means includes a plurality of flexible rods extending generally parallel to the shaft and a pair of collars mounted on the shaft each collar having a set of sockets for slidably receiving portions of the flexible rods, with one of the collars being secured to the shaft for rotation therewith and the other of the collars being secured to the stop member for rotation on the shaft.

Other features and advantages of the invention will appear from the description to follow of the presently preferred embodiment thereof disclosed in the accompanying drawings;

DESCRIPTION OF THE DRAWINGS

FIG. 1 is a side elevation of a portion of a roller conveyor with a stop device of the invention installed thereon;

FIG. 2 is a sectional elevation of a stop device constructed in accordance with the invention; and, FIG. 3 is an end elevation of the stop device on an enlarged scale, taken as indicated by the line 3—3 of FIG. 2.

DESCRIPTION OF THE PREFERRED EMBODIMENTS

A section of a conventional roller conveyor 10 is shown in FIG. 1, which conveyor may be either the gravity or powered roller type. An article 12 moves in the direction of the arrow 14 upon the supporting plane defined by the carrying rollers 15 of the conveyor. This movement of the article 12 can be arrested by a stop device 16 which is mounted between an adjacent pair of the carrying rollers 15 below the supporting plane defined thereby, and which includes a stop member 18 projecting above the article supporting plane and engageable by the leading face 19 of the article 12.

The construction of the stop device 16 is shown in detail in FIGS. 2 and 3. A shaft 22 is rotatably mounted in a pair of bearings 23 and 24 which are secured to the side frames 25 and 26 of the conveyor 10. The stop member 18 is moveable about the axis of the shaft 22, being secured to, and projecting radially outwardly from a sleeve 28 which is connected by bolts 29 to collars 30 and 31, each collar being rotatably mounted on the shaft 22.

Movement of the stop member 18 on the shaft 22 is resiliently limited by momentum absorbing means interposed between the stop member 18 and the shaft 22. In the construction shown, the momentum absorbing means consists of a plurality, or cluster, of flexible rods 34 mounted within the sleeve 28 and extending generally parallel to the axis of the shaft 22 in circumferentially and radially spaced relation therewith. One end of each of the rods 34 is slidably mounted in one of a set of sockets 35 formed in the collar 30, and the other end of each of the rods 34 is mounted in one of a second set of sockets 36 formed in a collar 38 secured to the shaft by a pin 40, the outer cylindrical surface 41 of the collar 38 being in clearance relation with the inside surface of the sleeve 28 adjacent thereto.

A member 44, secured to the shaft 22 outboard of the right hand bearing 24, as shown in FIG. 2, is provided with an abutment surface 45, shown in FIG. 3. This member 44 also carries a radially projecting control pin 46. A counterweight 47 secured to the shaft 22 outboard of the left hand bearing 23, as shown in FIG. 2, normally urges the shaft to a position in which the stop member 18 is in obstructing relation to the article 12.

Other details of the device will be apparent from a consideration of the operation thereof. As the article 12 moves in the direction of the arrow 14 from the position shown in FIG. 1, the leading face 19 of the article contacts the stop member 18, and causes the entire stop device 16 to rotate a few degrees in a counter-clockwise direction until the abutment 45 on the member 44 contacts a releasable latch device 48 mounted on the frame of the conveyor 10. This contact prevents further rotational movement of the shaft 22. Further movement of the stop member 18 and sleeve 28 on the shaft 22 is opposed by the flexible rods 34 which constitute a means for absorbing the momentum of the article 12 as the movement thereof is arrested.

The releasable latch device 48 includes a pair of pivotally connected moveable links 50, and a link 51 whose position is relatively fixed by a block 52 secured to the conveyor frame. A solenoid 54 has a plunger 55 which, when moved upwardly by energization of the solenoid, collapses the pivoted links 50 and withdraws the free end 56 thereof from the path of movement of the abutment 45 on the member 44. When the solenoid 54 is de-energized, the pivoted links 50 return to the position shown in FIG. 1 by gravity.

Assuming that movement of the article 12 has been arrested by operation of the stop device 16, as described above, and it is desired to have the movement of the article 12 resume, the solenoid 54 is energized, disengaging the end 56 of the pivoted links 50 from the abutment 45 on the stop device. The shaft 22 of the stop device is now free to rotate, and the article 12 resumes movement in the direction 14. The outer surface of the stop device sleeve 28 lies below the supporting plane defined by the article carrying rollers 15, so that the only portion of the stop device 16 engaged by the article at any time is the stop member 18. As the article advances, the stop member is rotated further in a counter-clockwise direction and is engaged by the bottom surface 58 of the article 12 until the article passes by the stop device 16. The shaft 22 and stop member 18 are then returned to the obstructing position of the stop member 18 relative to a succeeding article by the counterweight 47.

During the interval when the article 12 is passing over the stop device and until the shaft 22 and stop member 18 have been returned to the obstructing position of the stop member, the latch device 48 is retained in disengaged position by suitable control means which maintain the solenoid 54 in energized condition. The control means shown include a switch 60 connected in a holding circuit with the solenoid 54, and having an actuating arm 62. This arm 62 is operated by a slidably mounted rod 64 formed with an L-shaped upper end 65 that overlies the control pin 46. When the stop device 16 is in the obstructing position shown in FIG. 1, the control pin 46 engages the upper end 65 of the rod 64, urging the end 65 against a resiliently mounted motion limiting member 68, and the switch 60 is turned off. When the latch device 48 is disengaged from the abutment 45, as described above, the control pin 46 moves in a counter-clockwise direction with the shaft 22 of the stop device, permitting the sliding rod 64 to move downwardly and actuating the switch 60.

This form of releasable latch, and the control thereof, is representative of but one type of operation of the stop device 16, namely, where it is desired to have the stop member 18 return to article obstructing position after the release of each article. Obviously, other types of operation may be provided, such as one in which the stop member 18 is normally in a non-obstructing position and is selectively moveable to the obstructing position.

It will be apparent from the foregoing description that the stop device of the invention, while relatively compact, offers a momentum absorbing capability which is relatively great. This capability can of course be altered to suit the operating requirements by varying the number of flexible rods 34 or the flexing characteristics thereof. An additional cluster or clusters of flexible rods can also be incorporated in the stop device.

I claim:

1. A stop device for use with a conveyor to arrest movement of an article conveyed thereon, wherein the improvement comprises:
    a shaft;
    a stop member;
    means mounting the stop member on the shaft for movement relative thereto about the axis thereof;
    momentum absorbing means interposed between the stop member and the shaft for resiliently limiting said movement of the stop member;
    means supporting the shaft adjacent to the path of movement of the conveyed article for rotation of the shaft about the axis thereof between obstructing and non-obstructing positions of the stop member relative to the article; and,
    means for releasably preventing said rotation of the shaft when the stop member is in said obstructing relation to the conveyed article whereby engagement of the stop member by such article results in movement of the stop member on the shaft being opposed by said momentum absorbing means.

2. A stop device according to claim 1 further comprising means normally urging the shaft and stop member to rotate to said obstructing position.

3. A stop device according to claim 1 wherein the momentum absorbing means includes a flexible member extending generally parallel to the shaft, one portion of the flexible member being connected to the stop member for movement therewith and another portion of the flexible member being connected to the shaft, said portions being spaced apart axially of the shaft.

4. A stop device according to claim 1 wherein the momentum absorbing means includes a plurality of flexible rods extending generally parallel to the shaft, and mounting structure connecting one end of each of the flexible rods for movement with the stop member on the shaft and the other end of each of the flexible rods for movement with rotation of the shaft.

5. A stop device according to claim 3 wherein said mounting structure includes a pair of collars mounted on the shaft, each collar having a set of sockets for slidably receiving portions of said flexible rods, and one of the collars being secured to the shaft for rotation therewith and the other of the collars being secured to the stop member for rotation on the shaft.

6. A stop device according to claim 1 wherein the means supporting the shaft includes frame structure of a conveyor having a plurality of rollers defining a supporting plane along which the article is conveyed, the stop member in the obstructing position thereof projecting above said plane and being movable below said plane by said rotation of the shaft to the non-obstructing position of the stop member.

7. A stop device according to claim 6 further comprising a counter-weight mounted on the shaft normally urging the shaft and stop member to rotate to said obstructing position.

8. A stop device according to claim 6 further including a sleeve rotatably mounted on the shaft and having a cylindrical outer surface which is positioned below the article supporting plane defined by the conveyor rollers, said stop member being fixed to the sleeve and projecting radially outwardly therefrom.

9. A stop device according to claim 8 wherein the momentum absorbing means includes a plurality of flexible members, and means mounting the flexible members within said sleeve and extending generally parallel to the axis of the shaft in circumferentially and radially spaced relation therewith.

10. A stop device according to claim 9 wherein said mounting means includes a pair of collars positioned on the shaft in axially spaced relation, one of the collars being secured to the sleeve and rotatably engaging the shaft, the other of the collars being secured to the shaft for rotation therewith, and each of the collars having a set of sockets in which the ends of the flexible members are received.

11. A stop device according to claim 10 wherein the means for releasably preventing rotational movement of the shaft from said obstructing position includes an abutment secured to the shaft, a latch device mounted on the frame structure of the conveyor for engagement by the abutment and means for disengaging the latch device from the abutment.

12. A stop device according to claim 11 further including control means for retaining the latch device in disengaged position until the shaft has been returned to said obstructing position.

* * * * *